Feb. 21, 1967  R. L. SHEPPARD  3,304,981
SELF-INFLATING PNEUMATIC TIRES
Filed Feb. 15, 1965
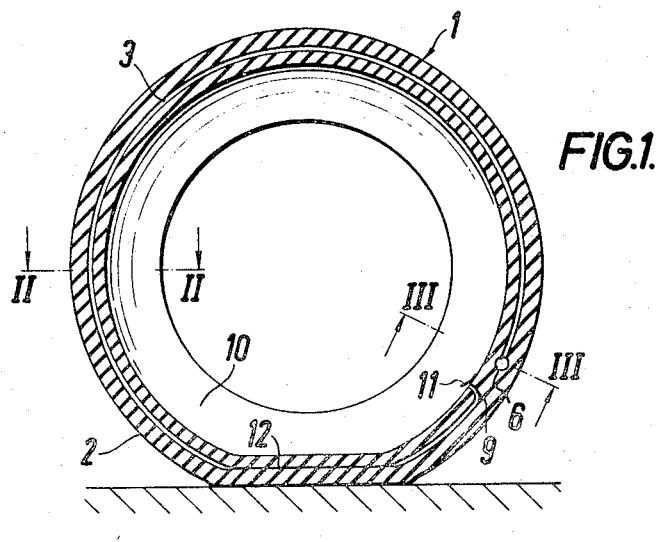
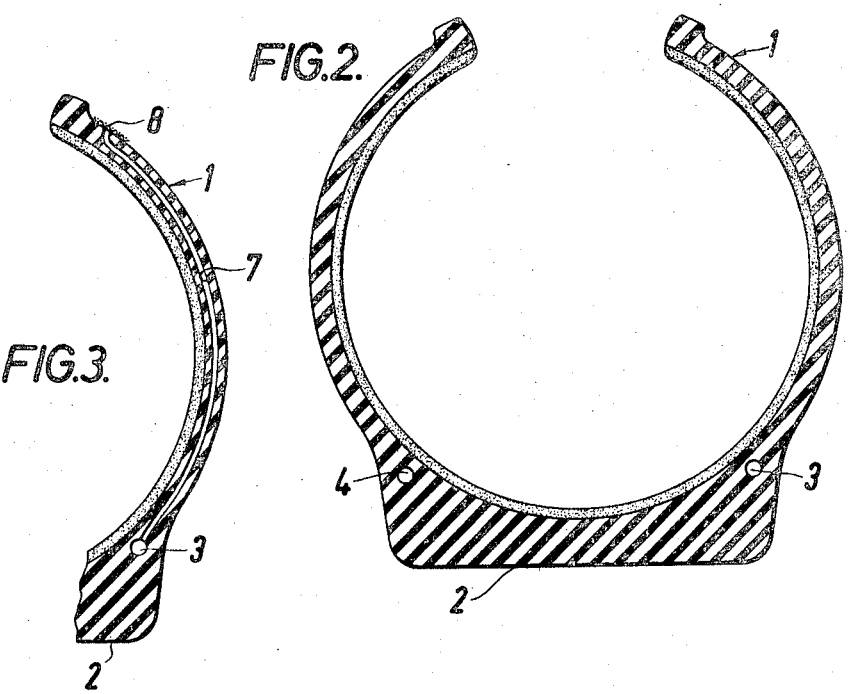
INVENTOR
RONALD L. SHEPPARD
ATTORNEYS

United States Patent Office 3,304,981
Patented Feb. 21, 1967

3,304,981
SELF-INFLATING PNEUMATIC TIRES
Ronald Leslie Sheppard, P.O. Box 16,
Richmond, Surrey, England
Filed Feb. 15, 1965, Ser. No. 432,508
Claims priority, application Great Britain, Feb. 24, 1964,
7,501/64; Aug. 8, 1964, 32,565/64
4 Claims. (Cl. 152—426)

This invention relates to self inflating pneumatic tires.

Difficulty has often been experienced with tires having slow punctures and this problem is accentuated where the spare wheel is flat, or is otherwise unusable. Thus in these circumstances the driver of the vehicle has had to keep pumping his tire up at frequent intervals in order to be able to complete his journey.

Also many people do not check their tire pressures with a frequency which ensures the maintenance of correct pressures and as a result of incorrect pressures, tire wear is increased and the life of the tire is reduced.

The present invention seeks to provide a self inflating tire which can overcome the disadvantages of the slow puncture while the vehicle is moving and which can under normal circumstances maintain the correct pressure with a minimum of attention.

According to the invention there is provided a self inflating pneumatic tire comprising a tire casing having a tread thereon, a circumferential tube provided in the tire beneath the tread, one end of the tube communicating with the outside of the tire and the other end communicating with the tire's air space and a non-return valve positioned at either end of the tube to permit air to enter the air space whereby as the tire rotates on a wheel in contact with a ground surface, successive portions of the tube are compressed to pump air from outside the tire into the air space.

Preferably the tube is so positioned in the tire that when the tire is fully inflated to the desired pressure, the tube is supported in such a way as not to be compressed and the pumping action ceases. A pressure relief valve may be provided to ensure that the tire is not over inflated.

The invention will now be described in greater detail by way of example with reference to the accompanying drawings, in which:

FIGURE 1 is a sectional view through a tubeless tire showing the inflating tube in accordance with the invention;

FIGURE 2 is a sectional view on the line II—II of FIGURE 1; and

FIGURE 3 is a part-sectional view on the line III—III of FIGURE 1.

Referring to the drawings, a self inflating tire comprises a casing 1 with a tread portion 2. Into the casing beneath the tread portion 2 are moulded two tubes or ducts 3 and 4, which extend circumferentially around the tire. Both ducts are only shown in FIGURE 2 but they are in fact identical but operate in opposite directions as will be hereinafter explained.

Considering only the tube 3, one end 6 is connected to the outside of the tire by a tube or duct 7 leading to the portion of the tire away from the tread. An air filter 8 is provided, moulded into the tire, to prevent dirt and water getting into the tubes 7 and 3. The other end 9 of the tube 3 is connected to the air space 10 of the tire by way of a flap valve 11.

As the tire rotates, the material of the tire and thus the inflating tube or duct 3 will be compressed as shown at 12 in FIGURE 1, closing the tube 3 at that point. This action will force and compress air along the tube, open the flap valve and pump air into the tire.

It will be appreciated that this pumping action will only work with one sense of rotation of the tire. To overcome this, the second tube 4 is provided, its only difference with regard to the tube 3 being that it is reversed and so can be used to inflate the tire when the tire is rotating in the opposite sense.

The tubes 3 and 4 are positioned off center around the tire so that when the desired pressure or a maximum safe pressure is reached, the tubes will not be compressed and the pumping action will cease.

It is also desirable to incorporate in the tire a pressure relief valve (not shown) which is adjustable to set the tire pressure to any desired value. The tire may have a patch moulded over the filter 8 which could be removed on purchase. Thus with the patch left on, the pumping action would be entirely cancelled, while when the patch is removed the tire becomes self inflating.

Should a flap valve 11 become faulty, air will be prevented from escaping by the compression of the appropriate tube 3 or 4 in the course of normal use.

A normal inflation valve is also provided (not shown) for normal inflation of the tire and this valve may incorporate the pressure relief valve above referred to.

Although the invention has been described with application to tubeless tires, it could equally well be applied to tires having inner tubes with suitable modifications.

I claim:

1. A self-inflating pneumatic tire comprising a tire casing, a tread on said casing, a circumferential tube provided in said casing beneath said tread and compressible when said tire rotatably contacts a ground surface to pump air therealong, means at one end of said tube communicating with the atmosphere at the outer surface of said casing at a location spaced from said tread and the other end of said tube communicating with the tire's air space, and a non-return valve positioned at one of the ends of said tube to admit atmospheric air into said air space and prevent its reemergence therefrom.

2. A self-inflating pneumatic tire according to claim 1 wherein said tube is formed by a duct molded integrally in the tire casing and having one end open to the air space of the tire, said means at the opposite end of the tube being a branch duct molded in the tire casing and running at an angle to the tube toward the rim attachment portion opposite the tread, said branch duct opening to the outer surface of the casing near said rim attachment portion.

3. A self-inflating pneumatic tire as claimed in claim 1, having an air filter moulded into the tire at the location where said means at one end of said tube communicates with the outside of said casing.

4. A self-inflating pneumatic tire comprising a tire casing, a tread on said casing, two parallel circumferential tubes provided in said casing beneath said tread and compressible when said tire rotatably contacts a ground surface to pump air therealong, one end of each of said tubes communicating with the outside of said casing and the other end of each of said tubes communicating with the tire's air space, and a non-return valve positioned at that end of each of said tubes which communicates with the tire air space to admit atmospheric air into said air space and prevent re-emergence therefrom, said tubes being adapted to pump air in opposite directions so that pumping of air into the tire's air space will take place during rotation of the tire in either sense.

References Cited by the Examiner

UNITED STATES PATENTS

| 1,050,886 | 1/1913 | Wetherell | 152—426 |
| 1,246,464 | 11/1917 | Randall | 152—426 |

FOREIGN PATENTS

| 183,890 | 3/1963 | Sweden. |

ARTHUR L. LA POINT, *Primary Examiner.*

C. W. HAEFELE, *Assistant Examiner.*